United States Patent [19]

Dammeyer et al.

[11] Patent Number: 5,509,509

[45] Date of Patent: Apr. 23, 1996

[54] PROPORTIONAL CONTROL OF A PERMANENT MAGNET BRAKE

[75] Inventors: Ned E. Dammeyer, New Bremen; John R. Harman, Versailles, both of Ohio

[73] Assignee: Crown Equipment Corporation, New Breman, Ohio

[21] Appl. No.: 343,372

[22] Filed: Nov. 22, 1994

Related U.S. Application Data

[63] Continuation-in-part of Ser. No. 116,976, Sep. 7, 1993, abandoned.

[51] Int. Cl.$^6$ .................................................. B60L 7/00
[52] U.S. Cl. ......................................................... 188/164
[58] Field of Search ............................... 188/158, 159, 188/160, 161, 163, 164, 181 A; 303/20; 310/103, 104, 105, 106; 318/362

[56] References Cited

U.S. PATENT DOCUMENTS

| | | | |
|---|---|---|---|
| 2,705,058 | 3/1955 | Harter | 188/164 |
| 2,765,878 | 10/1956 | Pierce | 188/164 |
| 3,055,470 | 9/1962 | Pierce | 192/21.5 |
| 3,199,645 | 8/1965 | Henning | 192/84 |
| 3,656,815 | 4/1972 | Talebi et al. | 188/181 A X |
| 3,673,563 | 6/1972 | Thielen et al. | 340/53 |
| 3,760,917 | 9/1973 | Pagdin | 192/84 C |
| 3,854,556 | 12/1974 | Gee | 188/181 R |
| 3,899,061 | 8/1975 | Krug | 188/164 |
| 4,133,407 | 1/1979 | Schantz | 180/108 |
| 4,152,617 | 5/1979 | Janson | 310/103 |
| 4,986,614 | 1/1990 | Ricker et al. | 303/115.2 |
| 5,057,728 | 10/1991 | Dammeyer et al. | 310/77 |
| 5,119,918 | 6/1992 | Pardee | 192/18 B |
| 5,163,744 | 11/1992 | Tierney et al. | 303/115.2 |
| 5,180,214 | 1/1993 | Yeh et al. | 303/111 |
| 5,205,620 | 4/1993 | Dammeyer et al. | 303/100 |
| 5,261,732 | 11/1993 | Matouka | 303/115.2 |

FOREIGN PATENT DOCUMENTS

| | | | |
|---|---|---|---|
| 0303331 | 12/1989 | Japan | 188/161 |
| 0046335 | 2/1990 | Japan | 188/161 |

Primary Examiner—Robert J. Oberleitner
Assistant Examiner—Peter M. Poon
Attorney, Agent, or Firm—Biebel & French

[57] ABSTRACT

A brake control apparatus for controlling the application of braking torque to a permanent magnet brake of the type wherein a permanent magnet creates a magnetic flux path for applying a braking torque and an electromagnet provides a continuously variable flux in opposition to the permanent magnet. Braking torque is controlled in response to a braking command signal from an operator controlled floor pedal or hand grip which varies in relation to the amount of braking desired. A control circuit responsive to the braking command signal causes braking torque to be generated in direct proportion to the amount of braking desired. The control circuit including a device for applying either direct current or pulses of current to the electromagnet, the pulse width of which varies from a minimum pulse width representing maximum braking to a maximum pulse width representing no braking. The pulses are monitored to insure proper operation. The current in the pulses is used as an indication of brake temperature and is used to control the pulse width of any given desired brake torque. A tachometer monitors the direction and speed of rotation of the braked wheel and an anti-skid algorithm modifies the pulses applied to prevent wheel lockup. The brake is fail safe since removal of current to the electromagnet either by operation of the control circuit or by an emergency removal of power will cause the permanent magnet to apply full braking torque.

19 Claims, 10 Drawing Sheets

PROPORTIONAL CONTROL OF A PERMANENT MAGNET BRAKE

RELATED APPLICATION

This application is a continuation-in-part of application Ser. No. 08/116,976, filed Sep. 7, 1993, now abandoned.

BACKGROUND OF THE INVENTION

This invention relates to a brake control apparatus and particularly to a proportional control circuit for a permanent magnet brake of the type wherein a permanent magnet creates a magnetic flux path for applying braking torque and an electromagnet provides a continuously variable magnetic flux in opposition to the permanent magnet. This invention has particular application to wheeled vehicles such as materials handling vehicles.

The brakes of many materials handling vehicles are spring applied and are released by the application of either hydraulic pressure or by means of an electric solenoid in opposition to the force of the spring. In those brakes, the amount of braking torque is controlled by the spring force applied to the brake shoes. One example of a control system for a brake of this type is shown in U.S. Pat. No. 5,205,620 where a materials handling vehicle, a turret stockpicker, includes brakes on the pair of load wheels which are adjusted to have one level of braking torque, while brakes on the pair of steered wheels are adjusted to have a second, usually lower, level of braking torque. Either pair of brakes may be applied individually or all together to provide three different levels of braking according to the vehicle speed.

Another brake is shown in U.S. Pat. No. 5,057,728. Here, the brake element itself includes two sets of springs and wherein a pair of electromagnets control which spring sets are applied at any given time thereby to provide a three step control over braking torque.

Proportional control of braking torque for spring actuated brakes is difficult because of the variable gap between the brake armature and the solenoid or electromagnetic coil acting on the armature, and also the variable forces applied by the spring to the armature. It would be desirable, however, to provide a proportional and continuous control of braking torque on a material handling vehicle.

SUMMARY OF THE INVENTION

This invention relates to an electric brake control apparatus providing proportional control over braking torque. Specifically, this invention may be used with brakes which are normally fully applied by means of a permanent magnet and which are released by application of electrical current to an electromagnetic coil which modifies the intensity of the magnetic flux applied to a brake armature. Such a brake is fail safe in that, upon the loss of electric current, the brake will be fully applied through the action of the permanent magnet.

An important consideration, particularly with material handling vehicles, is that this brake is fail safe. One such brake that might be used in connection with certain material handling vehicles is shown in U.S. Pat. No. 3,899,061. This brake includes a permanent magnet for applying braking torque and an electromagnet in the flux path to disengage the brake. Since temperature affects the resistance of the electromagnet, this patent also shows a compensating circuit so that the current required to maintain the brake fully released is properly maintained.

In one embodiment of the present invention, current to the electromagnetic coil is pulsed at a variable frequency and/or pulse width in response to a brake control signal, which is typically generated according to the position of a brake pedal or a hand grip. The brake control signal is applied to a control circuit which controls the pulses applied to the electromagnet to provide proportional and continuous control over braking torque, from no braking torque to full braking torque. The current during each pulse is measured when no braking torque is desired to provide information as to the temperature of the coil of the electromagnet, and in response thereto, appropriate compensation is made to insure that the brake will be fully released upon application of the appropriate level of current to the electromagnet. Should the control circuit fail to operate properly, the brake would be fully applied, thus failing safe. Also, the control circuit is responsive to other vehicle control functions, or an emergency power disconnect, to apply the brakes fully. In another embodiment of the invention, a controlled level of direct current is applied to the electromagnet to control braking torque.

In both of the embodiments of the invention disclosed above, braking torque can be increased by either increasing or decreasing the average current flow through the electromagnet. When decreasing average current flow, the permanent magnet provides the braking torque; when increasing average current flow, braking torque is provided by the magnetic flux generated by the electromagnet. The type and construction of permanent brake will often determine which method of braking torque control is preferred. When using the current flow through the electromagnet to increase braking torque, it may be desirable to limit the amount of time full braking torque is applied. For example, after a vehicle has been stopped for a predetermined length of time, current may be completely removed from the electromagnet, thus allowing the flux from the permanent magnet to maintain full braking torque.

The control circuit also monitors the speed of the wheel with which the brake is associated and an anti-skid algorithm is included in the control circuit to prevent the braking from locking up.

It is therefore an object of this invention to provide a brake control apparatus for a permanent magnet brake which provides proportional and continuous control over the braking torque generated by the brake.

It is a further object of this invention to provide a fail safe proportional braking control apparatus for use with a permanent magnet brake.

It is another object of this invention to provide a brake control apparatus of the type described that includes monitoring the temperature of the electromagnet and adjusting the current to maintain proportional control over braking torque.

It is another object of this invention to provide an anti-skid control for a proportionally controlled permanent magnet brake.

It is a further object of this invention to provide a brake control apparatus for controlling the application of braking torque to a permanent magnet brake of the type having a permanent magnet to create a magnetic flux path for applying a maximum braking torque and an electromagnet to provide a magnetic flux path in opposition to the permanent magnet to release completely said braking torque, the improvement comprising means for generating a braking command signal which varies continuously in relation to the amount of braking desired from zero braking to maximum braking, circuit means responsive to said braking command signal for controlling the amount of power applied to said electromagnet whereby the braking torque may be controlled in direct proportion to the amount of braking torque desired, said circuit means including means for applying a first predetermined amount of power to said electromagnet when no braking torque is desired, which first predetermined amount of power causes the magnetic flux produced by said permanent magnet to be counteracted by a magnetic flux of opposite polarity from said electromagnet, and means for modifying the amount of power applied to said electromagnet by a continuously variable amount thereby to change the effective magnetic flux generated by said electromagnet as said braking command signal increases from zero braking until maximum braking torque is obtained.

It is still a further object of this invention to provide a brake control apparatus as described wherein the amount of power to the electromagnet is increased by a continuously variable amount to increase continuously the magnetic flux of a polarity opposite that of said permanent magnet as said braking command signal increases from zero braking to maximum braking.

It is another object of this invention to provide a brake control apparatus as described wherein the amount of power to the electromagnet is decreased by a continuously variable amount as said braking command signal increases from zero braking to maximum braking to allow the flux from said permanent magnet to create a continuously increasing braking torque.

Other objects and advantages of the invention will be apparent from the following description, the accompanying drawings and the appended claims.

DESCRIPTION OF THE PREFERRED EMBODIMENT

Figure 1:
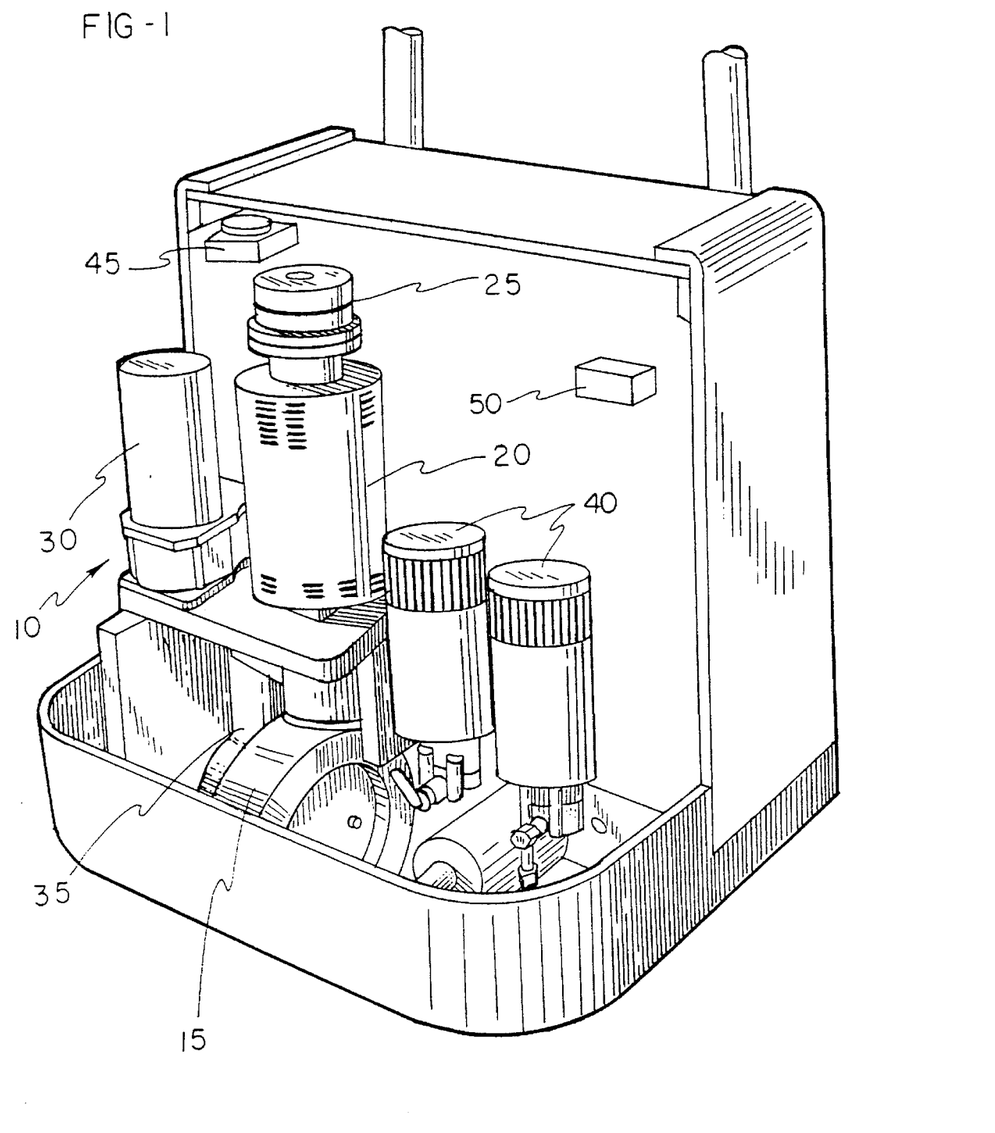
FIG. 1 is a perspective view of a stockpicker materials handling vehicle with its access cover removed showing a single drive wheel, a steering motor, a traction motor with associated brake, and electrically operated hydraulic pumps for its fork raising apparatus.

Referring now to the drawings which illustrate a preferred embodiment of the invention, and particularly to FIG. 1 where a power unit 10 of a typical materials handling vehicle is shown with its access cover removed. The vehicle may be of any type but might be a rider reach truck, such as a Series RR or RD truck or a stockpicker, such as a model SP36 truck, both manufactured by Crown Equipment Company. For purposes of illustration, the power unit 10 shown in FIG. 1 includes a single steerable wheel 15, which is powered by a drive motor 20, stopped by a brake 25, and electrically steered by means of a steering motor 30. Of course, this invention could be used on four-wheeled vehicles as well. The drive motor is connected to the axle of the wheel 15 though a gear reduction mechanism 35. Also shown in FIG. 1 are a pair of motor driven hydraulic motors 40 for providing hydraulic fluid to power other vehicle devices, such as the fork lifting mechanism. An emergency disconnect switch 45 is provided within ready access by the operator for the purpose of removing battery power to all vehicle systems. Within the power unit compartment are the vehicle control electronic circuits, including a brake control circuit 50.

Since the brake 25 is connected to the wheel through the gear reduction mechanism 35 by way of the shaft of motor 20, the size of the brake 25 may be reduced considerably over that required of a brake that is connected directly to the wheel of the vehicle.

Figure 2:
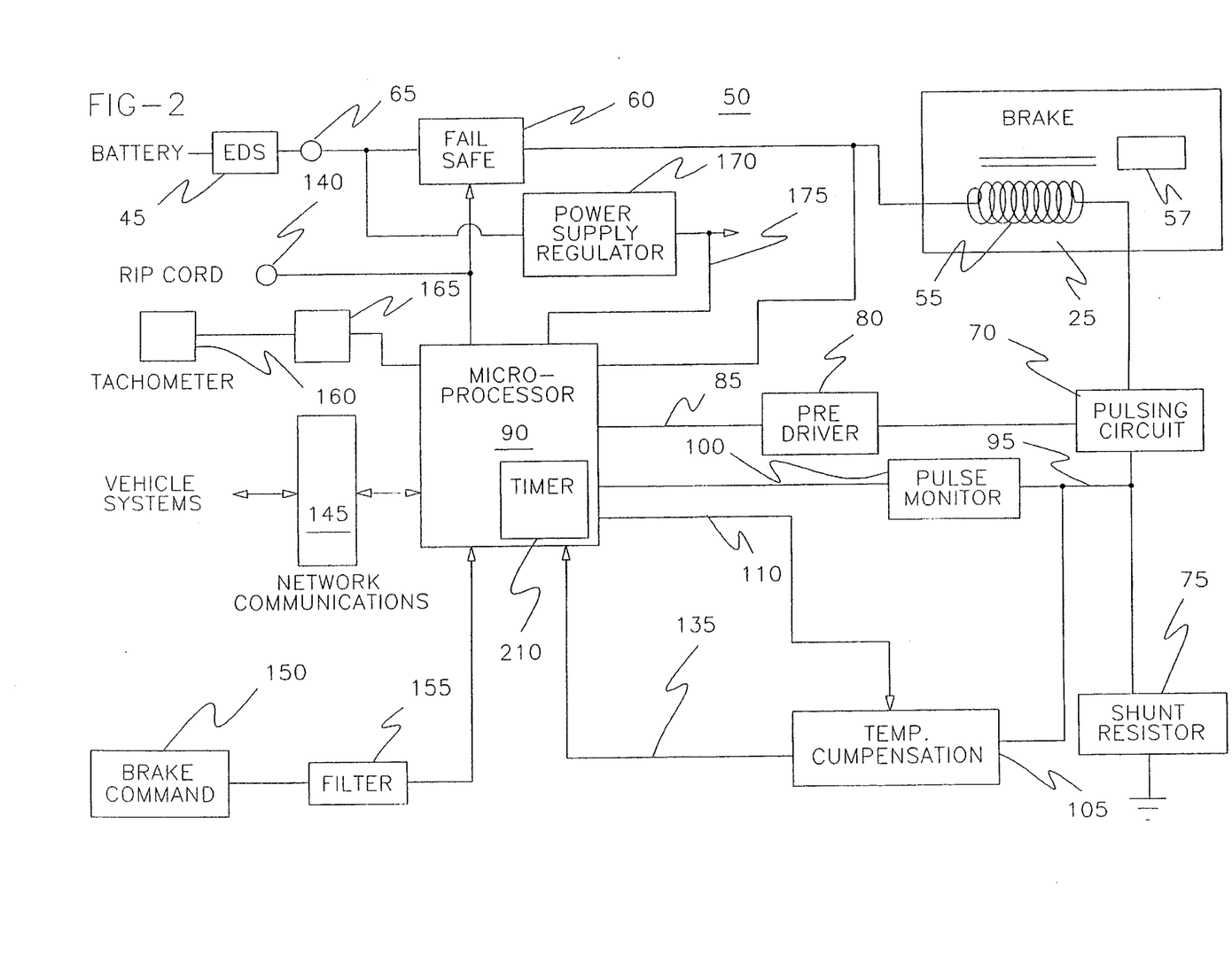
FIG. 2 is a electrical block diagram showing a control circuit of the present invention, including a microprocessor, for providing proportional control of a permanent magnet brake.

Referring now to FIG. 2, which is an electrical block diagram of the control circuit 50 for one embodiment of the present invention, one side of an electromagnetic coil 55 of brake 25 is shown connected through a fail-safe device 60 to the vehicle's battery through terminal 65 and emergency disconnect switch 45, and the other side of the coil is connected to ground through a pulse applying circuit 70 and shunt resistor 75.

The pulsing applying circuit 70 is a typical power control device, such as a MOSFET, capable of handling one to ten amperes. The pulsing circuit 70 is driven by a pre-driver circuit 80 which in turn receives a pulse command signal on line 85 from microprocessor 90 which controls the frequency and duration of each pulse. The pulse command signal is typically a 5 volt pulse while the output of the pre-driver circuit 80 is 12 volts or higher.

The shunt resistor 75 is included in the circuit to provide a signal on line 95 to pulse monitor circuit 1.00 and temperature compensation circuit 105. Pulse monitor circuit 100 is a device that detects the presence of pulses as they are applied to the electromagnet coil 55. The output of the pulse monitor circuit is applied to the microprocessor 90 as an indication that a continuous stream of pulses, regardless of width, is being applied to the brake. If the stream of pulses fails for any reason, either because the current to the brake is continuous or has fallen to zero, the microprocessor with provide an output to the fail-safe circuit 60 which will remove power entirely from the electromagnet, thus causing brake torque to be applied fully.

Figure 3:
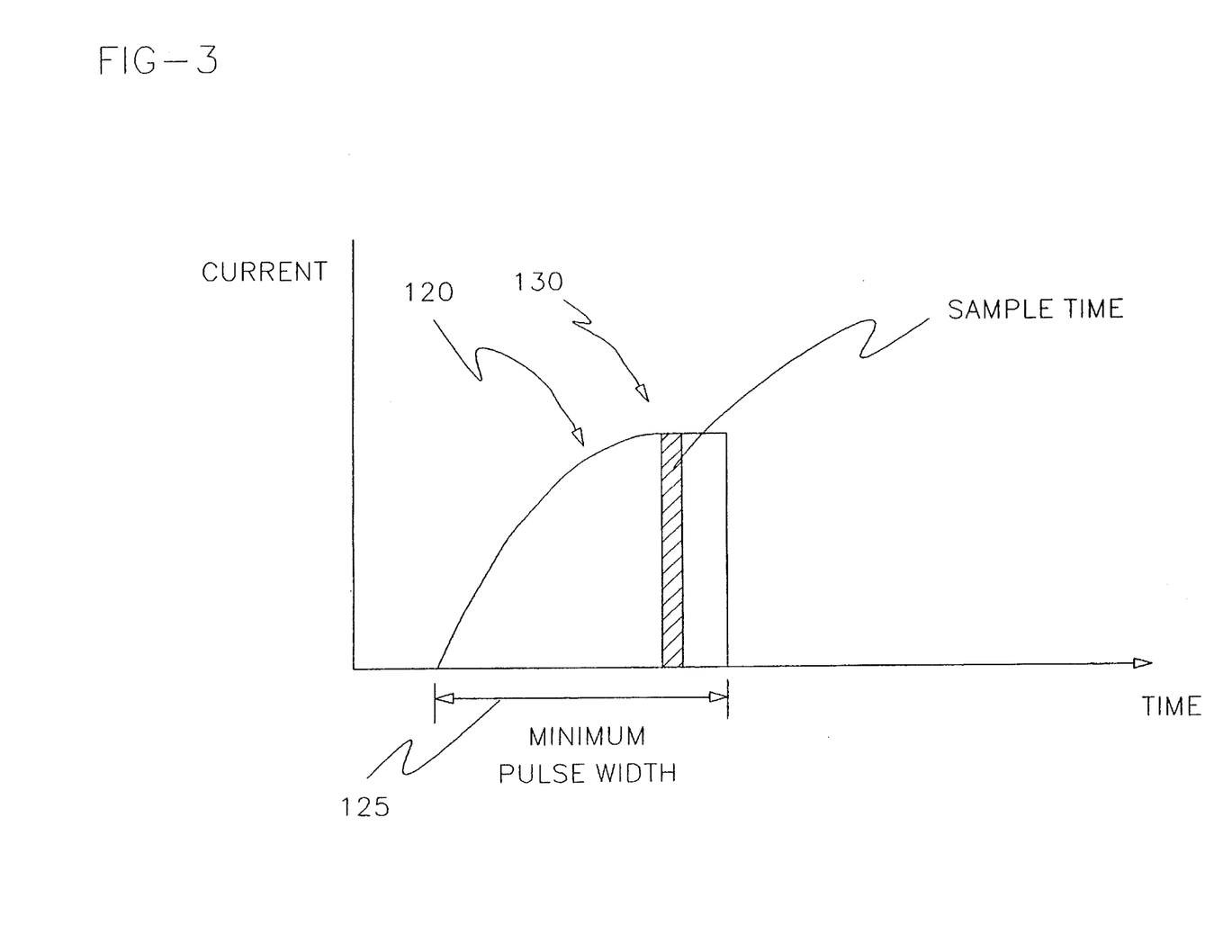
FIG. 3 is a waveform diagram showing a minimum pulse applied to the electromagnet within the brake.
Figure 4:
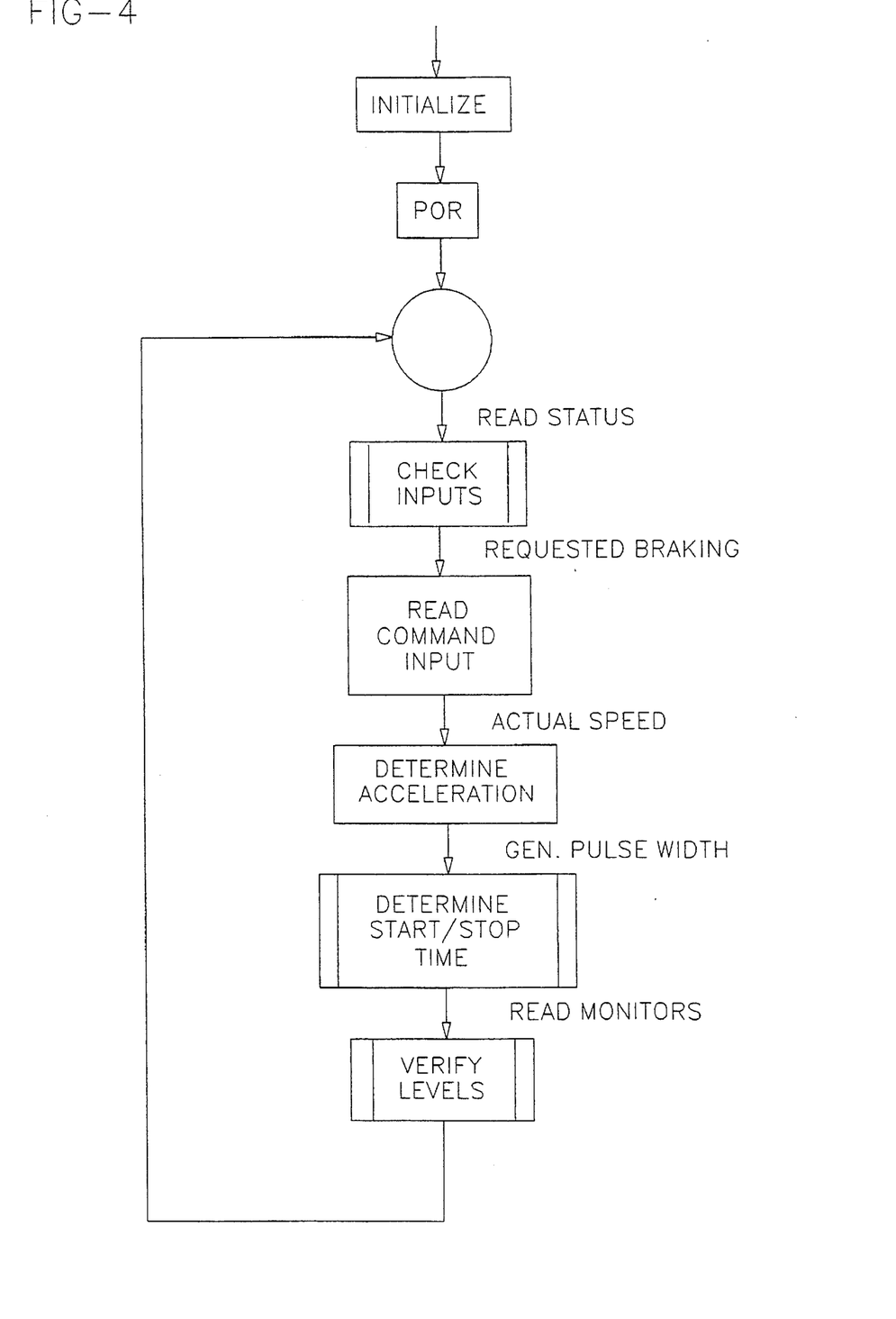
FIGS. 4–7 are flow charts showing the operation of the computer program which operates the microprocessor of FIG. 2.

The temperature compensation circuit 105 responds to a signal on line 110 from the microprocessor 90 to monitor the actual current being applied to the coil 55. As shown in FIG. 3, each pulse 120 has a minimum pulse width 125. As current is applied to the coil 55, current initially rises slowly due to the inductive reactance of the coil, but eventually reaches substantially its full current level at 130, at which time the microprocessor generates the signal on line 110 to cause a sample of the current level then flowing to the coil to be taken. This sample current level is converted and sent to the microprocessor 90 on line 135.

The actual current flowing to the coil during the sample interval is a function of battery voltage and the resistance of the coil, which is affected by temperature. In response to the sensing of the current sample, the microprocessor 90 uses either a look up table or a formula to adjust the characteristics of the pulse 120 to compensate for changes in resistance of the electromagnet due to temperature, thus providing for proportional control of braking regardless of temperature.

The fail-safe circuit 60 may be either a relay or a P-channel MOSFET. Its purpose is either to allow full flow of current to the brake electromagnet or to cut off current flow entirely, either under the direction of the microprocessor 90 or in response to an external control signal on line 140 from a so-called Rip Cord or auxiliary control line designed to intervene directly in the full application of the brake, outside the operation of the microprocessor or any network input from the vehicle control systems to the microprocessor through a network interface 145. A signal on Rip Cord line 140 will be acted upon immediately, in real time, causing the brakes to be applied fully, and will not be delayed by the network 145 or action of the microprocessor 90. For example, the Rip Cord signal may be initiated by a watch dog program in the vehicle's control system that is monitoring the proper operation of the microprocessor 90, and upon the detection of any failure, it will cause a signal to appear on line 140 to apply the brakes in the fail safe mode.

A brake pedal or hand grip 150 provides means for generating a braking command signal in response to the amount of braking torque desired, from 0% to 100% of the braking torque available from the brake 25. The braking command signal is either a digital or analog signal, and it passes through filter 155 to the microprocessor 90.

A tachometer 160 is associated with the wheel 15, the motor 20 or the brake 25 to provide information on the direction of travel, speed and acceleration of the wheel under all operating conditions. The output of the tachometer is a digital signal, which also includes direction of rotation information, is applied through filter 165 to the microprocessor 90.

Also shown in FIG. 2 is a power supply regulator circuit 170. An analog representation of the power supply voltage on line 175 is also applied as an input to the microprocessor 90. The power supply output is provided to the other circuits within FIG. 2 as well as other associated circuits within the vehicle.

Figure 5:
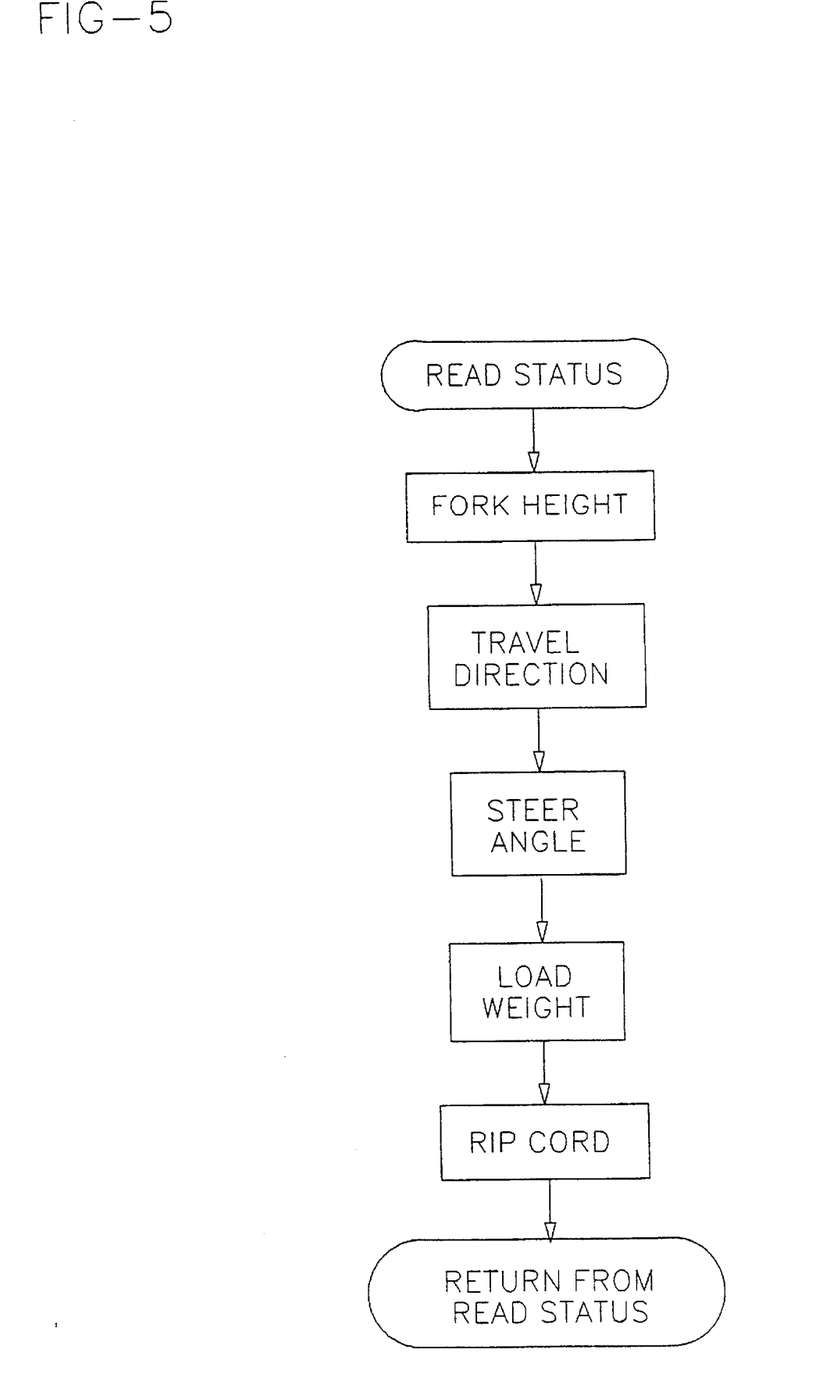

Referring now to the computer flow charts of FIGS. 4 through 7, the brake control system is primarily microprocessor controlled. Referring first to the master flow chart of FIG. 4, after the system is initialized, a POR or Power On Reset routine is employed, then the status of all components are checked for proper operation, that is, the input levels are checked to insure they are within acceptable ranges. FIG. 5 is a flow chart showing the Read Status routine which checks the various operating conditions of the vehicle, including fork height, travel direction, steering angle, weight on the forks, and the need for a rip cord command.

Figure 6:
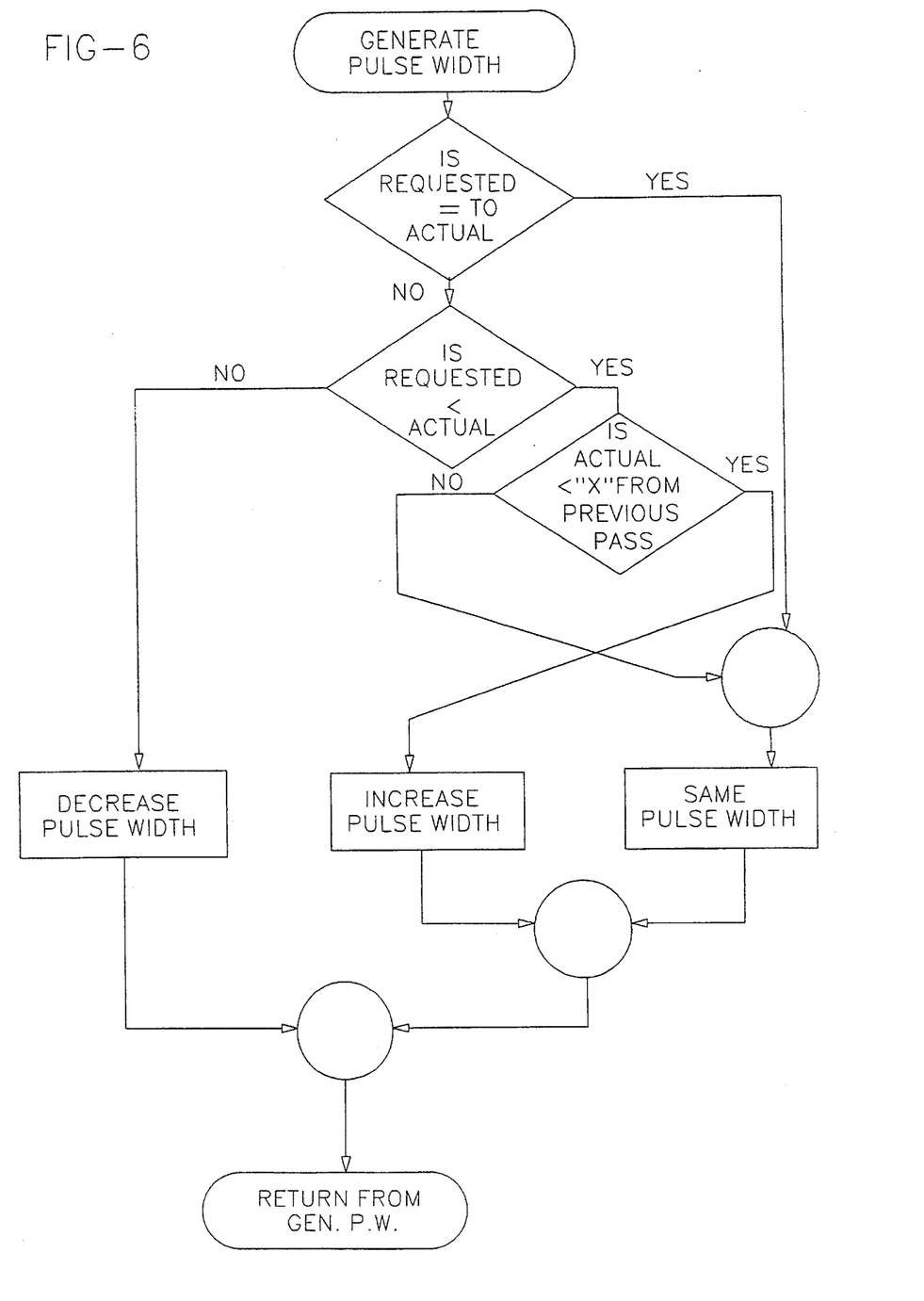

The requested braking command, from the operator controlled brake pedal or hand grip, is then compared with the actual acceleration, as monitored by reference to the wheel tachometer, and as a result, the appropriate width of the pulse applied to the brake electromagnet is generated, as shown in the flow chart of FIG. 6.

FIG. 6 also contains the anti skid routine whereby the pulse width is modified to release brake torque whenever the wheel is observed as beginning to lockup.

Figure 7:
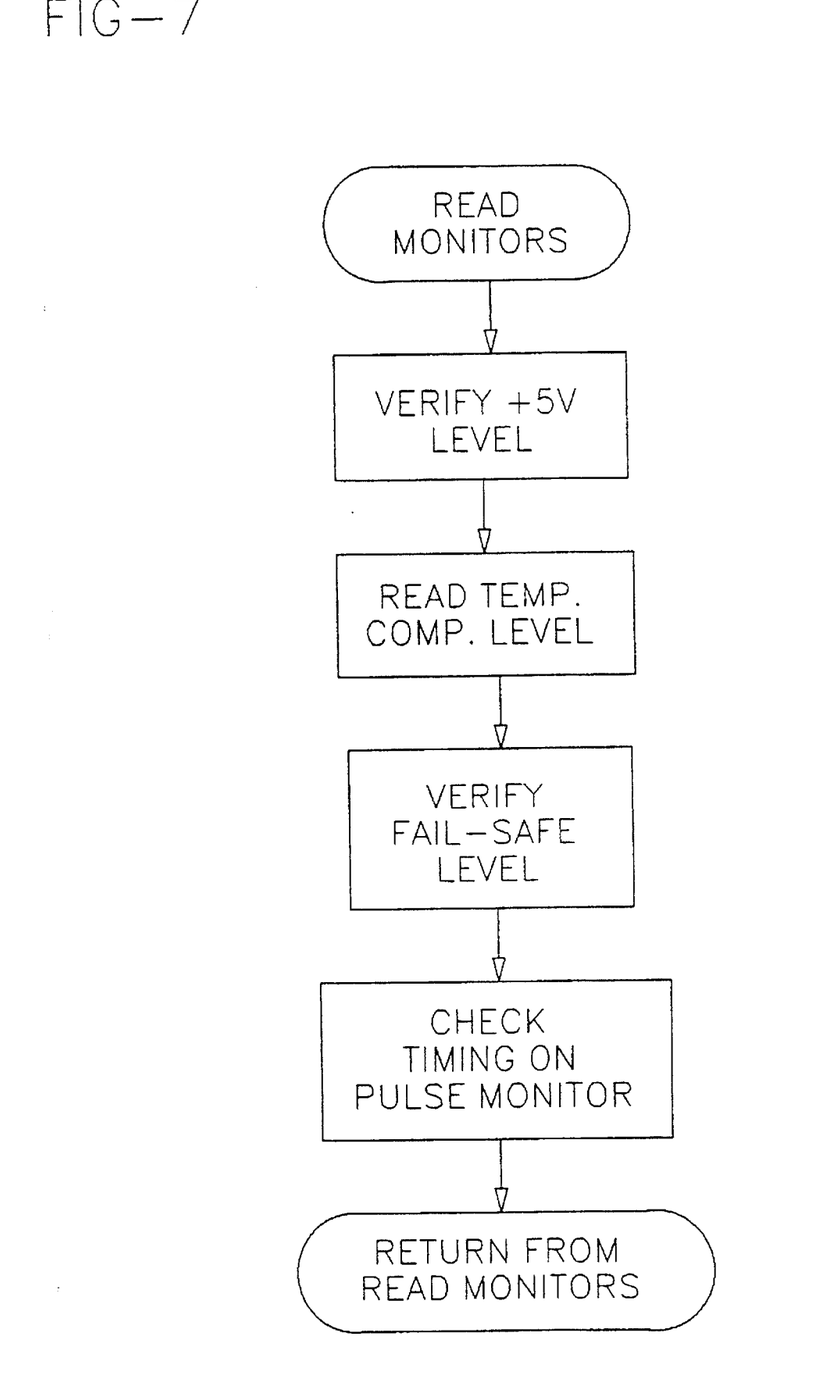

The Read Monitor routine, shown in the flow chart of FIG. 7, verifies the proper operation of the power supply, compensates for variations in temperature, verifies fail safe levels, and insures proper timing of the pulses applied to the electromagnet.

Upon receipt of a braking command signal, the microprocessor generates pulses that are sent on line 85 to the predriver circuit 80 and then to the pulsing circuit 70 to modify the magnetic torque already generated by the permanent magnet within the brake itself.

Figure 8:
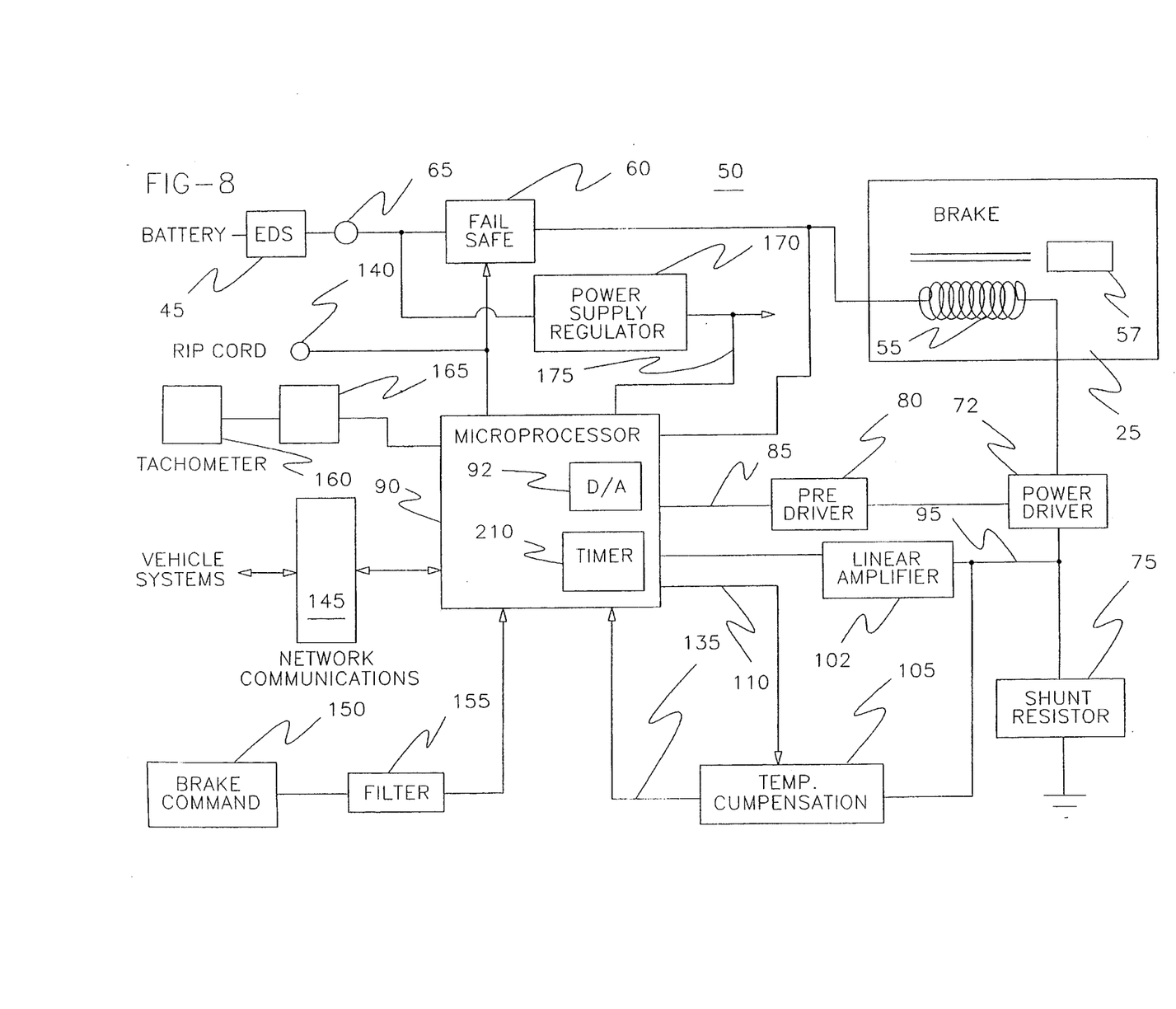
FIG. 8 is an electrical block diagram of a control circuit of another embodiment of this invention for providing proportional control of braking torque wherein controlled direct current is applied to the electromagnet.

Referring to FIG. 8, which is an electrical block diagram of a control circuit of another embodiment of this invention for providing proportional control of braking torque wherein controlled direct current is applied to the electromagnet, rather than using variable pulse rates and pulse widths to control the average current though the electromagnet coil 55, a direct current control circuit may be employed. In this embodiment, the microprocessor 90 includes a digital to analog converter 92 to provide control signals to predriver 80. A power driver circuit 72 is used in place of pulsing circuit 70, and linear amplifier 102 replaces the pulse monitor 100. In operation, the circuit of FIG. 9 operates in all essential respects the same as the circuit of FIG. 2, except that continuous direct current is applied to the electromagnet coil 55 rather than pulses of current.

Figure 9:
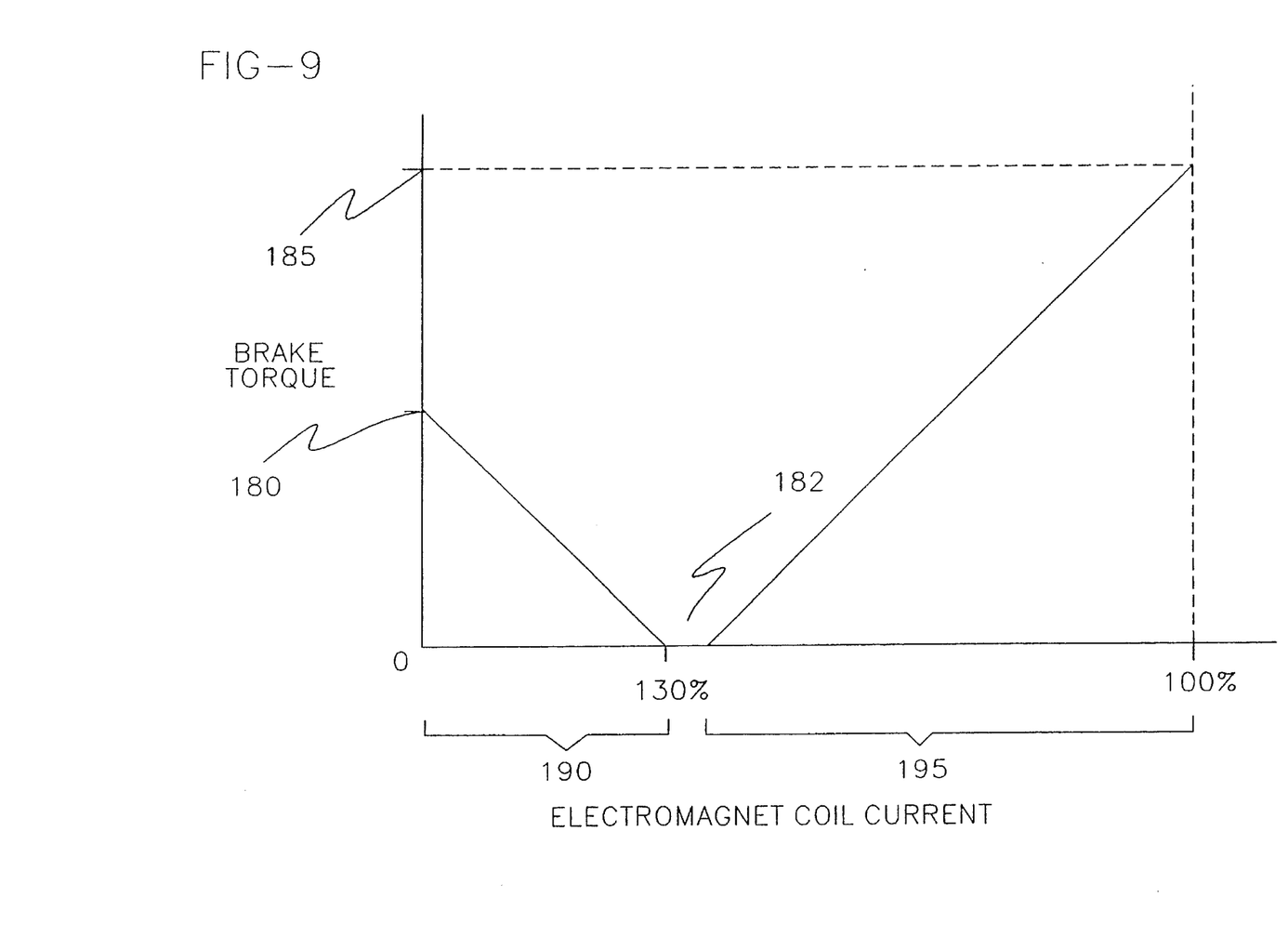
FIG. 9 is a graph showing a general relationship between average electromagnet coil current and brake torque.

There are two methods of controlling braking torque, as illustrated in FIG. 9, which is a graph showing a general relationship between average electromagnet coil current and brake torque. With a typical 24 volt, 24 watt electromagnet coil in a permanent magnet brake, the brake would be fully released at 30% of the rated current of the electromagnet, as shown at 182. At 0% current, the brake torque 180 would be entirely applied by the permanent magnet. At 100% current, braking torque 185 would be at its maximum.

In one embodiment of the present invention, the braking torque generated in zone 190, from 0% to 30% of electromagnet coil current, which results from the permanent magnet alone, is sufficient to meet industry standards. Since it is desired that the brake be fail safe, removal of all current from the electromagnet should provide maximum desired or necessary braking torque. In another embodiment of the invention, the electromagnet could be energized to its higher levels, in zone 195.

Figure 10:
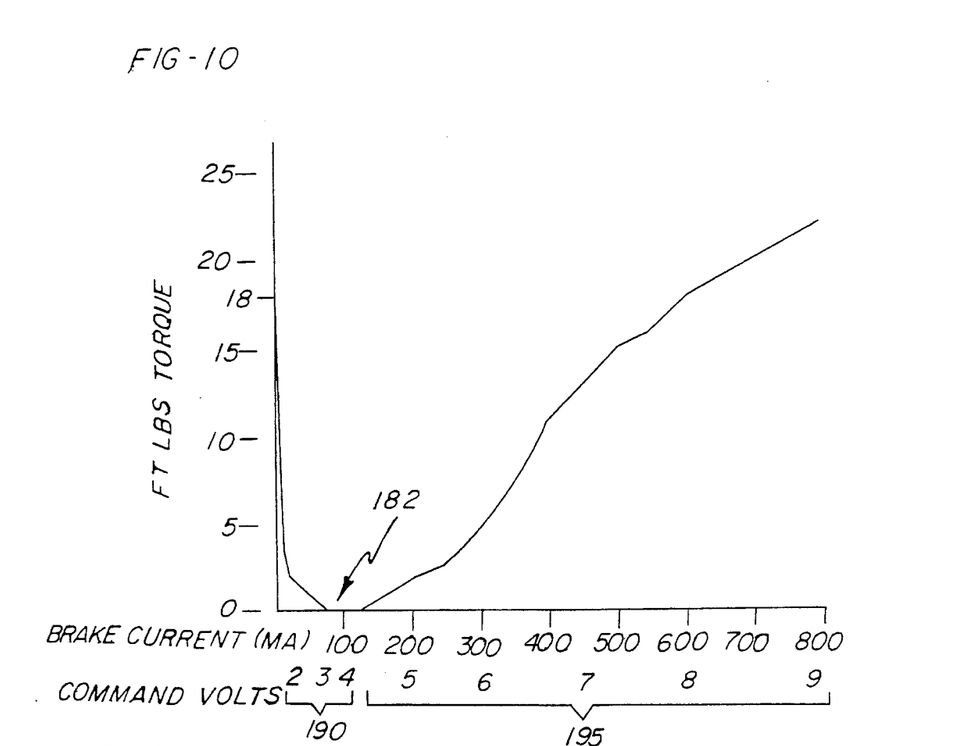
FIG. 10 is a graph showing a relationship between average electromagnet coil current and brake torque for one model of permanent magnet brake.

Turning now to specific examples of permanent magnet brakes, FIG. 10 is a graph showing a relationship between average electromagnet coil current and brake torque for one type of permanent magnet brake. In this brake, the range of control in the zone 190, from point 182 to the left in FIG. 10, is extremely limited. A maximum braking torque of 18 ft. lbs. is available by reason of its internal permanent magnet while 27 ft. lbs. of torque is available when its electromagnetic coil is provided with 1 ampere of current. Thus, in this particular brake, increasing the current to the coil 55 in the zone 195 provides large range of control, from 0 ft. lbs. at approximately 100 ma current, to 27 ft. lbs. at 1000 ma current in an approximately linear relationship.

A timer 210 is included in the microprocessor 90 to monitor the amount of time the electromagnet applies maximum braking torque. This could also be a function of the amount of time the vehicle remains stationary. The microprocessor 90 is responsive to the timer 210 and will disconnect or remove current to the electromagnet coil 55 after a predetermined amount of time. When this occurs, the permanent magnet will provide sufficient braking torque to be applied to hold the vehicle stationary.

Figure 11:
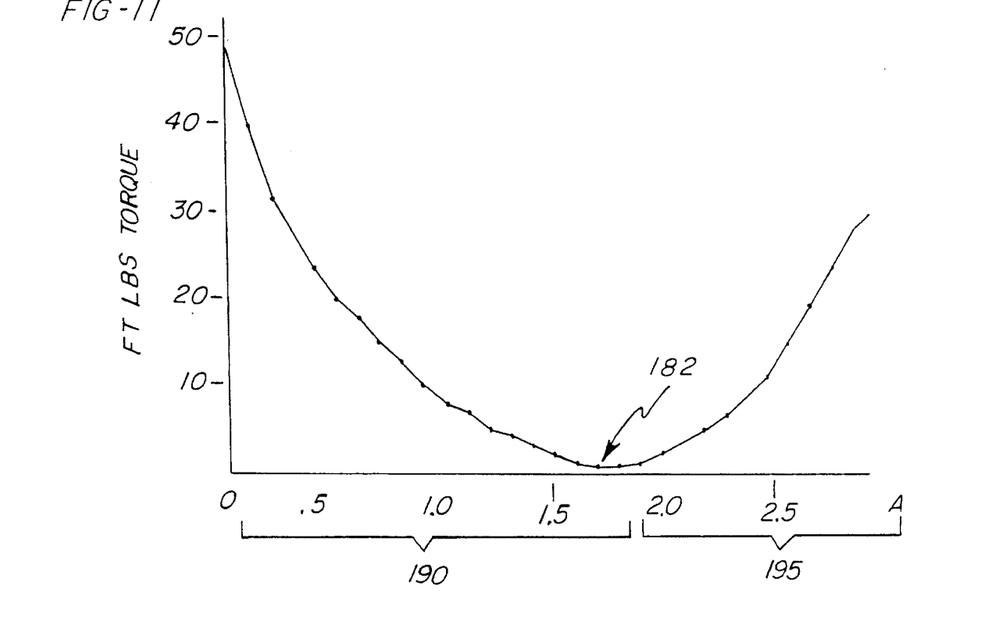
FIG. 11 is a graph showing a relationship between average electromagnet coil current and brake torque for another model of permanent magnet brake.

On the other hand, FIG. 11 is a graph showing a relationship between average electromagnet coil current and brake torque for another type of permanent magnet brake. With this particular brake, braking torque ranges from 48 ft. lbs. at zero coil current to zero ft. lbs. at approximately 1.75 amperes coil current. With this particular brake, the range of control is greatest in zone 190, that is, where braking torque increases as current to the coil is reduced.

While the microprocessor is controlling the average current, either direct current or pulses, to control braking torque, the pulse monitor 100 or linear amplifier 102 and temperature compensating circuit 105 are being monitored to insure that the system is operating properly and that the amount of current to the coil is being adjusted for changes in resistance due to temperature. Preferably, the compensation procedure is implemented when braking torque is approximately zero.

In summary, the present invention provides for a fail safe, proportional control over a permanent magnet brake of the type where in one embodiment the permanent magnet provides the braking torque and where an electromagnet modifies that braking torque and in another embodiment, the electromagnet provides full braking torque, but the permanent magnet is used to provide long term braking. Full braking torque is applied by a number of systems including the brake command signal in response to the operator depressing a brake pedal, the activation of an emergency stop or disconnect button, which removes all power to the brake coil, a rip cord signal which bypasses the microprocessor and communications network, the microprocessor upon detection of a fault in any of the internal systems or upon failure to detect the regular application of pulses to the brake coil. An anti skid algorithm monitors the acceleration of the braked wheel and prevents wheel lockup.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A brake control apparatus for controlling the application of braking torque to a permanent magnet brake of the type having a permanent magnet to create a magnetic flux path for applying a maximum braking torque and an electromagnet to provide a magnetic flux path in opposition to the permanent magnet to release completely said braking torque, the improvement comprising means for generating a braking command signal which varies continuously in relation to the amount of braking desired from zero braking to maximum braking, circuit means responsive to said braking command signal for controlling the amount of power applied to said electromagnet whereby the braking torque may be controlled in direct proportion to the amount of braking torque desired, said circuit means including means for applying a first predetermined amount of power to said electromagnet when no braking torque is desired, which first predetermined amount of power causes the magnetic flux produced by said permanent magnet to be counteracted by a magnetic flux of opposite polarity from said electromagnet, and means for modifying the amount of power applied to said electromagnet by a continuously variable amount thereby to change the effective magnetic flux generated by said electromagnet as said braking command signal increases from zero braking until maximum braking torque is obtained.

2. The brake control system of claim 1 wherein said modifying means includes means for applying additional power to said electromagnet to increase the magnetic flux of a polarity opposite that of said permanent magnet as said braking command signal increases from zero to maximum braking.

3. The brake control system of claim 2 further including means for monitoring the amount of time said electromagnet applies maximum braking torque, means responsive to said time monitoring means for disconnecting said electromagnet after a predetermined amount of time whereby said permanent magnet will cause maximum braking torque to be applied.

4. The brake control system of claim 1 wherein said modifying means includes means for applying reduced power to said electromagnet to decrease the magnetic flux of a polarity opposite that of said permanent magnet as said braking command signal increases from zero to maximum braking, thus allowing the flux from said permanent magnet to apply a continuously increasing braking torque.

5. The brake control system of claim 1 wherein said circuit means for controlling the amount of the power applied to said electromagnet includes means for controlling the amount of direct current applied to said electromagnet.

6. The brake control apparatus of claim 1 wherein removal of power from said electromagnet for any reason will cause said brake to engage fully.

7. The brake control system of claim 1 wherein said circuit means for controlling the amount of the power applied to said electromagnet includes means for applying pulses of current to said electromagnet and said modifying means controls pulse rate and pulse width of said pulses of current.

8. The brake control apparatus of claim 7 further including means for sensing the presence of said pulses of current to said electromagnet, and means responsive to said sensing means for removing all current to said electromagnet upon the failure of said sensing means to detect the presence of said pulses of current.

9. The brake control apparatus of claim 7 wherein said apparatus is used on a wheel of a vehicle, said apparatus further including means for sensing the speed of the wheel, anti-skid means responsive to said wheel speed sensing means for controlling the application of said pulses to said electromagnet for preventing the onset of wheel lockup.

10. The brake control apparatus of claim 7 further including means for sensing the magnitude of the current flowing through said electromagnet during said pulses as an indication of the temperature of said electromagnet, and means responsive to said current sensing means for adjusting the pulse width to compensate for changes in resistance of said electromagnet due to temperature.

11. The apparatus of claim 10 wherein said current sensing means and said pulse width adjusting means includes a microprocessor, said microprocessor providing control signals for controlling the frequency and duration of said pulses and for providing a sampling pulse at a predetermined time interval after the beginning of each of said pulses, and means for monitoring the current level at said predetermined time interval after the beginning of each pulse and for providing a representation of said current level to said microprocessor as an indication of the actual temperature of said electromagnet.

12. The brake control apparatus of claim 11 further including a look up table for modifying the frequency and duration of said pulses in response to said current sensing means.

13. The brake control apparatus of claim 11 wherein said microprocessor for controlling the frequency and duration of said pulses includes an algorithm.

14. The brake control apparatus of claim 11 wherein said apparatus includes a fail safe circuit for removing current from said electromagnet upon the occurrence of a stop signal on a direct communications wire or a signal from said microprocessor.

15. The brake control apparatus of claim 11 wherein a malfunction of said microprocessor will cause said brake to fully engage.

16. The brake control apparatus of claim 11 wherein the absence of regular application of said pulses to said electromagnet will cause said brake to fully engage.

17. The brake control apparatus of claim 11 wherein the deviation of any power supply voltage beyond predetermined limits will cause said brake to fully engage.

18. A brake control apparatus for controlling the application of braking torque to a permanent magnet brake including a permanent magnet for creating a magnetic flux path for applying a maximum braking torque, an electromagnet for providing a magnetic flux path in opposition to the permanent magnet to release completely said braking torque, means for generating a braking command signal which varies continuously in relation to the amount of braking desired from zero braking to maximum braking, circuit means responsive to said braking command signal for controlling the amount of power applied to said electromagnet whereby the braking torque may be controlled in direct proportion to the amount of braking torque desired, said circuit means including means for applying a first predetermined amount of power to said electromagnet when no braking torque is desired, which first predetermined amount of power causes the magnetic flux produced by said permanent magnet to be counteracted by a magnetic flux of opposite polarity from said electromagnet, and means for applying additional power to said electromagnet in a continuously variable amount to increase continuously the magnetic flux of a polarity opposite that of said permanent magnet as said braking command signal increases from zero braking to maximum braking.

19. A brake control apparatus for controlling the application of braking torque to a permanent magnet brake including a permanent magnet for creating a magnetic flux path for applying a maximum braking torque, an electromagnet for providing a magnetic flux path in opposition to the permanent magnet to release completely said braking torque, means for generating a braking command signal which varies continuously in relation to the amount of braking desired from zero braking to maximum braking, circuit means responsive to said braking command signal for controlling the amount of power applied to said electromagnet whereby the braking torque may be controlled in direct proportion to the amount of braking torque desired, said circuit means including means for applying a first predetermined amount of power to said electromagnet when no braking torque is desired, which first predetermined amount of power causes the magnetic flux produced by said permanent magnet to be counteracted by a magnetic flux of opposite polarity from said electromagnet, and means for decreasing the power applied to said electromagnet in a continuously variable amount as said braking command signal increases from zero braking to maximum braking to allow the flux from said permanent magnet to create a continuously increasing braking torque.

* * * * *